July 17, 1928.

J. G. SWAIN 1,677,854

WHEEL

Filed July 29, 1924

INVENTOR.
JOSEPH G. SWAIN
BY
ATTORNEY.

Patented July 17, 1928.

1,677,854

UNITED STATES PATENT OFFICE.

JOSEPH G. SWAIN, OF AKRON, OHIO, ASSIGNOR TO THE FIRESTONE STEEL PRODUCTS COMPANY, OF AKRON, OHIO, A CORPORATION OF OHIO.

WHEEL.

Application filed July 29, 1924. Serial No. 728,875.

This invention relates to vehicle wheels for receiving demountable rims such as are used on motor vehicles, and more particularly to such wheels having steel fellies.

The chief object of the invention is to provide a wheel with a steel felly which is strong, yet light and inexpensive to manufacture and, moreover, which is so formed as to provide an improved manner of seating rim clamps thereon.

The above and other objects of the invention will be better understood when the following brief description thereof is read in connection with the accompanying drawings, it being understood that the invention is not limited to the specific structure shown and described.

Figure 1:
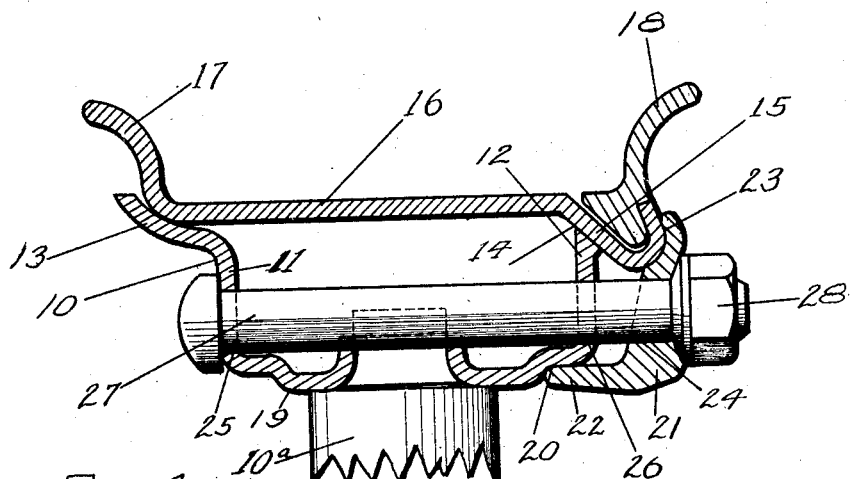
Figure 2:
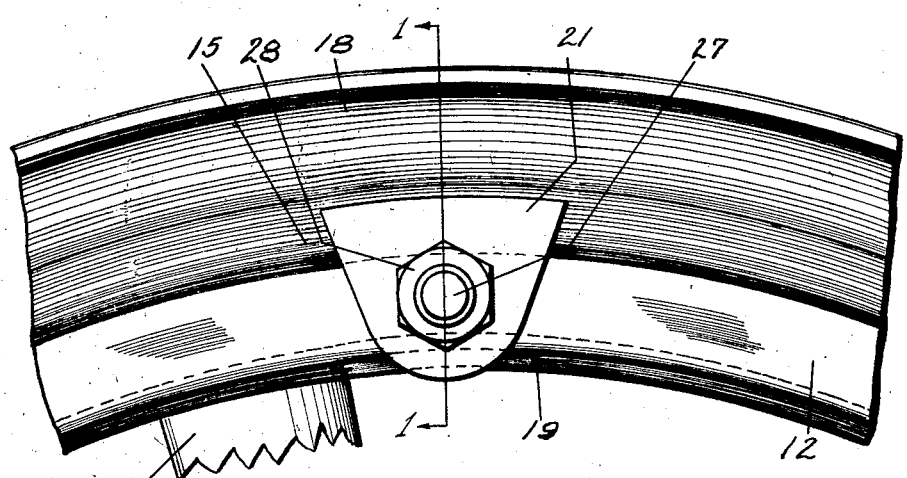

Of the accompanying drawings:

Figure 1 is a transverse section of a felly and rim mounted thereon, the section being taken on line 1—1 on Figure 2, which illustrates one embodiment of the invention; and Figure 2 is a side elevation in part, of a felly and rim mounted thereon.

Referring to the drawings, 10 is a steel felly mounted in a known manner on spokes indicated at 10ª. The felly 10 has the usual radial flanges 11 and 12, the inner of which, 11, is formed with the usual rim seating flange 13, and the outer of which is formed with a seat 14 sloping outwardly of the felly so as to provide a seat for the gutter 15 of a known type of demountable rim 16. The rim 16 has the usual inner flange 17 and an outer split flange ring 18 seated within the gutter 15.

The present invention is directed to the provision on the inner periphery of the felly 10 of a crown 19 extending circumferentially about the felly. It has been found that by such construction, light weight stock can be employed out of which a strong felly of improved appearance can be obtained. The provision of a crown 19 has the additional purpose of providing a seat 20 on which clamps, indicated at 21, may fulcrum, the clamps 21 being formed substantially L-shaped in cross-section and having a fulcrum 22 at the end of the short arm and a portion 23 at the end of the long arm adapted to engage the gutter 15 to force the rim 16 on its seats 13 and 14. The long arm of the clamp 21 has a bolt aperture 24 in alignment with bolt apertures 25 and 26 respectively in the flanges 11 and 12. Bolts 27 are inserted through the apertures 25, 26 and 24 and nuts 28 are screw-threadedly received on the bolts for urging clamps 21 against the felly and rim.

In mounting a rim on the felly, the former is rocked onto the latter in the usual manner and the clamps 21 are applied to the bolts 27 and urged against the rim and felly, the fulcrum portion 20 of the clamp engaging the edge of the crown on the felly to fulcrum the clamps. In demounting the rim, the reverse operations are performed as will be understood.

Modifications of the invention may be resorted to without departing from the spirit or the scope of the appended claims.

What I claim is:

1. A vehicle wheel comprising a felly having an annular base which is generally flat in transverse section, said base having a crown extending inwardly circumferentially of the inner periphery, and rim-seating flanges extending outwardly from said base, said flanges having aligned bolt-receiving apertures therein, bolts in said apertures, and clamps on the bolts, one edge of said crown being adapted to form a seat for said clamps.

2. A vehicle wheel having, in combination, a metal felly formed with a generally transversely flat base having a crown extending inwardly therefrom and with rim-seating flanges having transversely aligned apertures, bolts in the apertures, and rim clamps on the bolts, said clamps having fulcrums adapted to seat on one edge of said crown.

JOSEPH G. SWAIN.